United States Patent [19]

Böhm

[11] Patent Number: 4,884,868

[45] Date of Patent: Dec. 5, 1989

[54] OPTICAL COMPONENT FOR SEPARATING LIGHT INTO DIFFERENT WAVELENGTH COMPONENTS

[75] Inventor: Heinz Böhm, Erlangen, Fed. Rep. of Germany

[73] Assignee: U.S. Philips Corp., New York, N.Y.

[21] Appl. No.: 694,188

[22] Filed: Jan. 23, 1985

[30] Foreign Application Priority Data

Jan. 24, 1984 [DE] Fed. Rep. of Germany ....... 3402258

[51] Int. Cl.$^4$ .............................................. G02B 5/00
[52] U.S. Cl. ................................. 350/168; 350/96.19; 350/166; 350/413
[58] Field of Search .............. 350/96.10, 96.12, 96.15, 350/96.16, 96.18, 96.19, 164, 165, 166, 168, 169, 321, 413, 96.31

[56] References Cited

U.S. PATENT DOCUMENTS

| 3,970,360 | 7/1976 | Kersten et al. | 350/96.12 X |
| 4,145,456 | 3/1979 | Küppers et al. | 350/96.31 X |
| 4,296,143 | 10/1981 | Franken et al. | 427/38 |
| 4,482,207 | 11/1984 | Thomas | 350/96.19 X |

FOREIGN PATENT DOCUMENTS

| 0017296 | 10/1980 | European Pat. Off. | |
| 0031027 | 7/1981 | European Pat. Off. | 350/168 |
| 53-90956 | 8/1978 | Japan | 350/96.15 |
| 57-26805 | 2/1982 | Japan | 350/168 |
| 58-176615 | 10/1983 | Japan | 350/169 |

OTHER PUBLICATIONS van der Ziel, "Phase-Matched Harmonic Generation in a Laminar . . . ", *Appl. Phys. Lett.*, vol. 26, No. 2, Jan. 1975, pp. 60-1.

Sheem, "Three-Dimensional Curved Surface for Integrated Optics", *Applied Optics*, vol. 14, No. 8, Aug. 1975, pp. 1854-9.

*Primary Examiner*—John D. Lee
*Attorney, Agent, or Firm*—William L. Botjer

[57] ABSTRACT

A plurality of glass layers are deposited from the vapor phase on a substrate. The layers have different refractive indices. The deposited layers produce an optical dispersion component useful in optical communication. Two rotatably journalled optical components provide an optical element having an adjustable dispersion.

9 Claims, 1 Drawing Sheet

OPTICAL COMPONENT FOR SEPARATING LIGHT INTO DIFFERENT WAVELENGTH COMPONENTS

BACKGROUND OF THE INVENTION

The invention relates to an optical dispersion component for separating light into different wavelength components, in particular to a device for use in optical communication. Such components are necessary, for example, in wavelength multiplexing in optical transmission technology.

Dispersion prisms are known light dispersing components. The dispersion of such prisms depends on the type of glass used. Dispersion prisms have the disadvantages of comparatively large transmission losses and only a small degree of dispersion.

SUMMARY OF THE INVENTION

It is an object of the invention to provide a wavelength dispersing component having selectable and/or adjustable dispersion and having relatively small transmission losses.

This object is achieved, according to the invention, with an optical component comprising a plurality of glass layers of different refractive indices which are deposited from the vapor phase on a substrate. Optically active faces are provided which intersect the substrate.

The dispersion of the component according to the invention depends on the refractive index distribution in the glass layer structure, the distance between the optically active surfaces, and the orientation (inclination) of the active surfaces with respect to each other.

The refractive index distribution may be linear or nonlinear or partly linear and partly nonlinear. In the latter case the light dispersing component may also be image-forming.

A light dispersing component may also be provided with additional image-forming properties by providing cylindrical or circularly cylindrical optically active surfaces in which the generatrix of the cylinder surface intersects the surface of the substrate, or by providing spherical optically active surfaces. The curved surfaces may be obtained by polishing or etching.

The optical components according to the invention may be manufactured by depositing, from the vapor phase layers of doped silica on a substrate. The substrate may be, for example, a substrate of vitreous silica. The layers of doped silica may be, for example, germanium oxide-doped silica. For this purpose the so-called nonisothermal PCVD process may be used to deposit the layers. (See U.S. Pat. No. 4,145,456.)

A nonisothermal plasma activated CVD process is here understood to mean a CVD process activated by a cold plasma, in which only the electrons have high kinetic energy. With such a plasma it is possible to react mixtures of gases which could not be reacted thermally.

It is also possible with the nonisothermal plasma activated CVD process to deposit glass layers directly from the gas phase at comparatively low temperatures. This is advantageous as compared with processes in which a glass soot layer is deposited. The glass soot must be heated to obtain a compact glass layer.

It is further advantageous that in using the present process with deposition at a comparatively low temperature, for example at a temperature between ambient and 300° C., any difference in the thermal expansion coefficients of the glass substrate and the deposited layers is not detrimental.

Single components can be obtained from a glass layer-covered substrate by simple mechanical separation processes such as sawing, cutting or breaking. At the same time, the optically active surfaces may be formed. The optically active surfaces so formed may thereafter be polished if necessary.

In this way, optical components may be manufactured having dispersions which may be chosen between wide limits. The high purity layers can be deposited from the gas phase. Therefore components can be obtained with low transmission losses.

DESCRIPTION OF THE PREFERRED EMBODIMENTS

Figure 1:
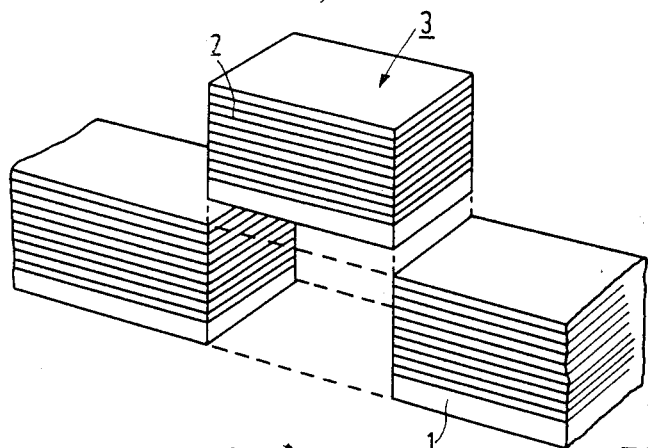
FIG. 1 is a perspective view of a stage in the manufacture of a light dispersing component according to the invention.

FIG. 1 shows a stage in the manufacture of a light dispersing component. A plurality of thin germanium oxide-doped silica layers 2 are deposited on a glass plate 1 by the nonisothermal PCVD method. The layers are doped in such manner that a linear refractive index distribution is obtained. The glass layers each have a thickness of about 0.5 microns. In a practical case, 2000 layers were deposited on top of each other. The glass plate is cut into components 3 (for example, by sawing or by scratching and breaking).

Figure 2:
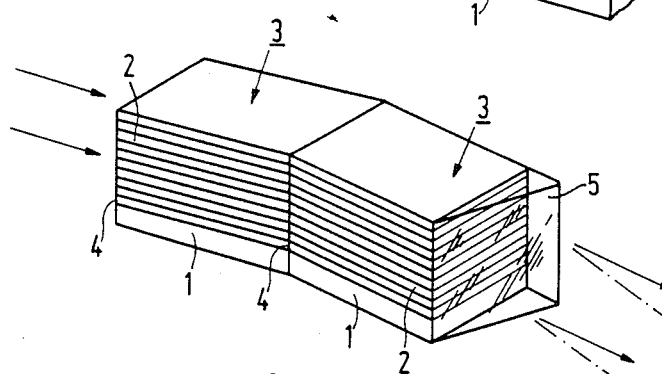
FIG. 2 is a perspective view of an optical system consisting of three light dispersing components.

The invention can comprise a combination of similar components into a composite optical component, as shown in FIG. 2. The boundary faces 4 of the FIG. 2 component (which is provided with the same reference numerals for the same parts as in FIG. 1) are at an angle to each other. The inclinations of the optically active faces 4 with respect to each other have been chosen so that at a selected wavelength the light passes perpendicularly through the optically active faces 4 both when entering and when leaving the component.

The system shown in FIG. 2 consists of two components adhered together at the faces 4. A conventional prism 5 is attached at one end of the component. The change of the direction of the radiation and the degree of dispersion is increased by arranging the dispersing components in a series.

Figure 3:
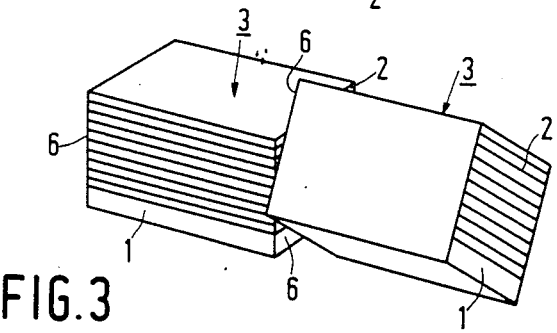
FIG. 3 is a perspective view of another embodiment of an optical system of light dispersing components.

FIG. 3 shows a composite component in which the dispersion can be adjusted mechanically. For this purpose, two light dispersing components according to the invention are connected together at their faces and are journalled so as to be rotatable with respect to each other. In one position, the dispersion of one component is subtracted from the dispersion of the other component. In the opposite position, the dispersions are added to each other. When provided with suitable mechanical guiding means (not shown) the degree of dispersion obtained from the component shown in FIG. 3 is adjustable. The optical faces 6 remain parallel to each other in all positions.

Figure 4:
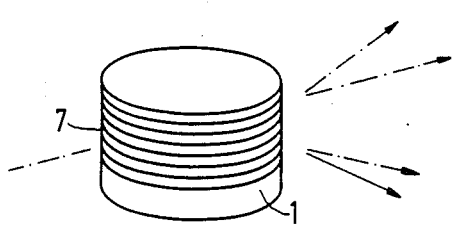
FIG. 4 is a perspective view of a further embodiment of a light dispersing component.

In a modified embodiment (FIG. 4), the optically active faces 4 are provided with a cylindrical (for example circularly cylindrical) curvature 7. The generatrix intersects the substrate in this embodiment. Such a light dispersing component also has image-forming properties which can be used in wavelength multiplexing when light of closely adjacent wavelengths is separated and united, respectively, by display and dispersion, and when the light dispersion is as much as possible, free from losses and crosstalk phenomena.

Figure 5:
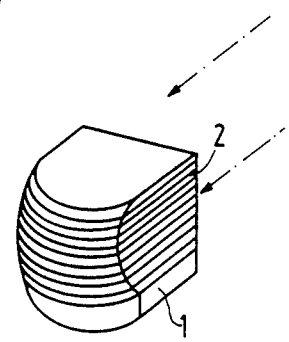
FIG. 5 is a perspective view of another embodiment of a light dispersing component.

FIG. 5 shows another embodiment in which the component has one spherical optically active surface. The numerals 1 and 2 have the same meanings as in the other figures (the substrate and the deposited layers, respectively). The spherical curvature can be obtained by polishing. The arrows show the direction of the light entering the component.

What is claimed is:

1. An optical device for separating a light beam into its component wavelengths, said device comprising:
   a substrate; and
   a plurality of substantially planar glass layers stacked on the substrate, adjacent glass layers having different refractive indices, said stack of glass layers being provided with first and second optically active faces, said optically active faces being parallel to each other and intersecting the substrate.

2. An optical device for separating a light beam into its component wavelengths, said device comprising:
   a substrate; and
   a plurality of substantially planar glass layers stacked on the substrate, adjacent glass layers having different refractive indices, said stack of glass layers being provided with first and second optically active faces, said optically active faces intersecting the substrate, at least one face not being perpendicular to the substrate.

3. An optical device for separating a light beam into its component wavelengths, said device comprising:
   a substrate; and
   a plurality of substantially planar glass layers stacked on the substrate, adjacent glass layers having different refractive indices, said stack of glass layers being provided with first and second optically active faces, said optically active faces intersecting the substrate, at least one face being nonplanar.

4. An optical device as claimed in claim 3, characterized in that the nonplanar face is cylindrical with a generatrix perpendicular to the substrate.

5. An optical device as claimed in claim 3, characterized in that the nonplanar face is spherical.

6. An optical device as claimed in claim 5, characterized in that each glass layer has a thickness of approximately 0.5 microns.

7. An optical device for separating a light beam into its component wavelengths, said device comprising:
   a first substrate with a plurality of substantially planar glass layers stacked on the substrate, adjacent glass layers having different refractive indices, said stack of glass layers being provided with first and second optically active faces, said optically active faces intersecting the substrate; and
   a second substrate with a plurality of substantially planar glass layers stacked on the substrate, adjacent glass layers having different refractive indices, said stack of glass layers being provided with third and fourth optically active faces, said optically active faces intersecting the substrate;
   characterized in that the second optically active face is optically coupled to the third optically active face.

8. An optical device as claimed in claim 7, characterized in that the second optically active face is rotatable with respect to the third optically active face around an axis which is transverse to the second optically active face, said second optically active face being rotatable while maintaining the second and third faces optically coupled to each other.

9. An optical device for separating a light beam into its component wavelengths, said device comprising:
   a substrate; and
   a plurality of substantially planar glass layers stacked on the substrate, adjacent glass layers having different refractive indices, said stack of glass layers being provided with first and second optically active faces, said optically active faces intersecting the substrate, the stacked layers producing a linear refractive index distribution.

* * * * *